(12) United States Patent
Yamasaki et al.

(10) Patent No.: US 7,392,784 B2
(45) Date of Patent: Jul. 1, 2008

(54) AIR INTAKE DEVICE OF INTERNAL COMBUSTION ENGINE

(75) Inventors: Takashi Yamasaki, Osaka (JP); Koji Fujimoto, Osaka (JP); Jun Katakawa, Osaka (JP); Eiichi Komatsu, Osaka (JP); Tetsu Yamada, Toyota (JP); Toshio Nakagawa, Kariya (JP); Tetsuo Nakagawa, Kariya (JP); Takuji Atomura, Kariya (JP); Katsunori Kamiya, Kariya (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 11/628,070

(22) PCT Filed: Feb. 28, 2005

(86) PCT No.: PCT/JP2005/003272

§ 371 (c)(1),
(2), (4) Date: Nov. 29, 2006

(87) PCT Pub. No.: WO2005/119043

PCT Pub. Date: Dec. 15, 2005

(65) Prior Publication Data

US 2007/0193554 A1    Aug. 23, 2007

(30) Foreign Application Priority Data

Jun. 1, 2004    (JP) ............................. 2004-163276

(51) Int. Cl.
*F02M 35/02* (2006.01)
*F02M 35/10* (2006.01)

(52) U.S. Cl. .............................. 123/198 E; 123/184.21
(58) Field of Classification Search ............ 123/184.21, 123/184.61, 184.57, 198 E
See application file for complete search history.

(56) References Cited

U.S. PATENT DOCUMENTS 6,863,044 B2 *   3/2005   Nakamura et al. ....... 123/198 E (Continued)

FOREIGN PATENT DOCUMENTS

EP    0 787 613    9/2001

(Continued)

OTHER PUBLICATIONS

International Search Report for the corresponding International Application PCT/JP2005/003272, mailed Apr. 26, 2005.

*Primary Examiner*—Stephen K. Cronin
*Assistant Examiner*—Hyder Ali
(74) *Attorney, Agent, or Firm*—Hamre, Schumann, Mueller & Larson, P.C.

(57) ABSTRACT

An air intake device of an internal combustion engine which is capable of enhancing the air intake efficiency and reducing the size is provided. The internal combustion engine includes a cylinder head, an intake manifold provided at a longitudinal side surface of the cylinder head, and a head cover provided on the cylinder head. The air intake device of the internal combustion engine includes an air cleaner including an upper casing and a lower casing detachably coupled to each other and incorporating a filter element, an atmospheric air introduction pipe for introducing air to the air cleaner, and an intake pipe extending from the air cleaner to the intake manifold.

5 Claims, 5 Drawing Sheets

U.S. PATENT DOCUMENTS 7,263,962 B2 * 9/2007 Ohara .................. 123/184.57

FOREIGN PATENT DOCUMENTS

| | | |
|---|---|---|
| EP | 1 182 343 | 9/2006 |
| JP | 1-102469 | 7/1989 |
| JP | 4-104134 | 9/1992 |
| JP | 9-209861 | 8/1997 |
| JP | 11-125160 | 5/1999 |
| JP | 11-294280 | 10/1999 |
| JP | 2002-97920 | 4/2002 |
| JP | 2003-129815 | 5/2003 |
| JP | 2003-161216 | 6/2003 |

* cited by examiner

AIR INTAKE DEVICE OF INTERNAL COMBUSTION ENGINE

TECHNICAL FIELD

The present invention relates to an intake device for guiding atmospheric air to an intake manifold via an air cleaner in an internal combustion engine.

BACKGROUND ART

Generally, this kind of air intake device comprises an air cleaner incorporating a filter element, an atmospheric air introduction pipe for introducing atmospheric air into the air cleaner, and an intake pipe for introducing the air cleaned by the air cleaner into the intake manifold in the internal combustion engine. To enhance the air intake efficiency of the internal combustion engine, the atmospheric air introduction pipe and the intake pipe need to have a sufficient length.

The Patent Document 1 as a prior art proposes to arrange an air cleaner on a head cover covering the upper surface of a cylinder head in an internal combustion engine. The air cleaner includes two divided parts and a filter element sandwiched therebetween.

In the structure proposed by the Patent Document 2 as another prior art, a surge tank in an intake manifold is provided on a head cover covering the upper surface of a cylinder head of an internal combustion engine so that an end of the surge tank projects from a longitudinal end of the head cover. An air cleaner is arranged at a lower surface of the surge tank at a portion which projects from the head cover.

The Patent Document 3 as another prior art proposes to arrange a casing, which includes two vertically divided parts, on a head cover covering the upper surface of a cylinder head of an internal combustion engine. In the casing, an air cleaner and an atmospheric air introduction pipe for introducing air to the air cleaner are incorporated, and an intake pipe for guiding air from the air cleaner to the intake manifold is provided.

However, to arrange an air cleaner on the upper side of a head cover covering the upper surface of a cylinder head like the Patent Document 1 causes the following problems.

Since the entirety of the air cleaner projects from the upper surface of the head cover, the total height of the internal combustion engine considerably increases.

Further, since the atmospheric air introduction pipe needs to have a sufficient length to enhance the air intake efficiency, the atmospheric air introduction pipe projects largely from the internal combustion engine in plan view. Therefore, space for accommodating such a projecting portion needs to be secured around the internal combustion engine.

Moreover, the intake pipe extending from the air cleaner to the intake manifold cannot have a length sufficient to enhance the air intake efficiency.

In the structure disclosed in the Patent Document 2 again, the atmospheric air introduction pipe for introducing air to the air cleaner projects from the internal combustion engine. Therefore, space for accommodating the atmospheric air introduction pipe needs to be secured around the internal combustion engine. Further, an intake passage having a length sufficient to enhance the air intake efficiency cannot be defined between the air cleaner and the surge tank in the intake manifold.

With the structure disclosed in the Patent Document 3, the entirety of the air cleaner projects from the upper surface of the head cover, similarly to the structure of the Patent Document 1. Therefore, the total height of the internal combustion engine considerably increases.

Patent Document 1: JP-A 2002-97920
Patent Document 2: JP-A 2003-239815
Patent Document 3: JP-A 2003-161216

DISCLOSURE OF THE INVENTION

Problems to be Solved by the Invention

A technical object of the present invention is to provide an air intake device which is capable of solving the above-described problems, reducing the number of parts and facilitating the replacement of a filter element.

Means for Solving the Problems

To achieve the technical object, claim 1 of the present invention provides an air intake device of an internal combustion engine including a cylinder head, an intake manifold provided at a longitudinal side surface of the cylinder head, the side surface extending in parallel with a crank axis of the cylinder head, and a head cover provided on the cylinder head. The air intake device comprises an air cleaner including an upper casing and a lower casing detachably coupled to each other and incorporating a filter element, an atmospheric air introduction pipe for introducing air to the air cleaner, and an intake pipe extending from the air cleaner to the intake manifold. The air cleaner is provided at an end of the head cover in a direction of the crank axis so that the lower casing of the air cleaner vertically corresponds to the head cover. The atmospheric air introduction pipe is arranged above the head cover to extend along an upper surface of the head cover in the direction of the crank axis, whereas the intake pipe is arranged to extend along the upper surface of the head cover toward the intake manifold without overlapping the atmospheric air introduction pipe.

According to claim 2 of the present invention, in the structure of claim 1, the intake pipe has a flat cross section elongated along the upper surface of the head cover.

According to claim 3 of the present invention, in the structure of claim 1 or 2, the lower casing of the air cleaner is on a dust side, whereas the upper casing of the air cleaner is on a clean side. The lower casing is formed integrally on the head cover, whereas the atmospheric air introduction pipe and the intake pipe are formed integrally on the upper casing so that the atmospheric air introduction pipe opens into the lower casing.

According to claim 4 of the present invention, in the structure of claim 3, engagement means for removable engagement is provided between the atmospheric air introduction pipe and the head cover.

According to claim 5 of the present invention, in the structure of claim 3 or 4, the atmospheric air introduction pipe is connected to the intake manifold via a connection pipe made of an elastic material.

Advantages of the Invention

With the structure as set forth in claim 1, the height of the portion of the air cleaner which projects upward from the upper surface of the head cover can be reduced by as much as the dimension by which the lower casing of the air cleaner vertically corresponds to the head cover. Therefore, the entire height of the internal combustion engine can be reduced.

Moreover, the entire length of the head cover in the direction of the crank axis can be utilized for the arrangement of the atmospheric air introduction pipe for introducing air into the air cleaner and the air intake pipe for sucking air from the air cleaner. Therefore, both of the atmospheric air introduction pipe and the air intake pipe can have a length sufficient to enhance the air intake efficiency, while, at the same time, the portion of the atmospheric air introduction pipe which projects from the internal combustion engine can be made small or eliminated.

Therefore, both of the enhancement of the air intake efficiency and the size reduction of the entire internal combustion engine can be reliably achieved.

With the structure as set forth in claim 2, the cross sectional area of the passage in the intake pipe can be increased without increasing the height of the portion of the intake pipe which projects from the upper surface of the head cover. Therefore, the flow resistance in the intake pipe can be reduced, whereby the air intake efficiency can be enhanced.

With the structure as set forth in claim 3, the lower casing of the air cleaner is formed integrally on the head cover, whereas the atmospheric air introduction pipe and the intake pipe are formed integrally on the upper casing. Therefore, the number of parts is considerably reduced, and the assembling of the parts can be facilitated. Further, the strength of the head cover and the lower casing of the air cleaner can be mutually increased.

Since the lower casing of the air cleaner which is integral with the head cover is on a dust side whereas the upper casing removably coupled to the lower casing is on a clean side, little dust adheres to the upper casing, although much dust adheres to the lower casing. Therefore, scatter of dust in detaching the upper casing to replace the filter element can be kept to a minimum.

With the structure as set forth in claim 4, the atmospheric air introduction pipe is fixed to the head cover by the engagement means. Therefore, the atmospheric air introduction pipe is reliably prevented from vibrating.

Moreover, in coupling the upper casing to the lower casing of the air cleaner, the positioning of the upper casing relative to the lower casing can be performed easily and accurately by utilizing the engagement means. Therefore, the replacement of the filter element can be facilitated.

With the structure as set forth in claim 5, the upper casing can be lifted from the lower casing while bending the connection pipe made of an elastic material. Therefore, the replacement of the filter element can be performed easily without disassembling the connection pipe.

DESCRIPTION OF SIGNS

Figure 1:
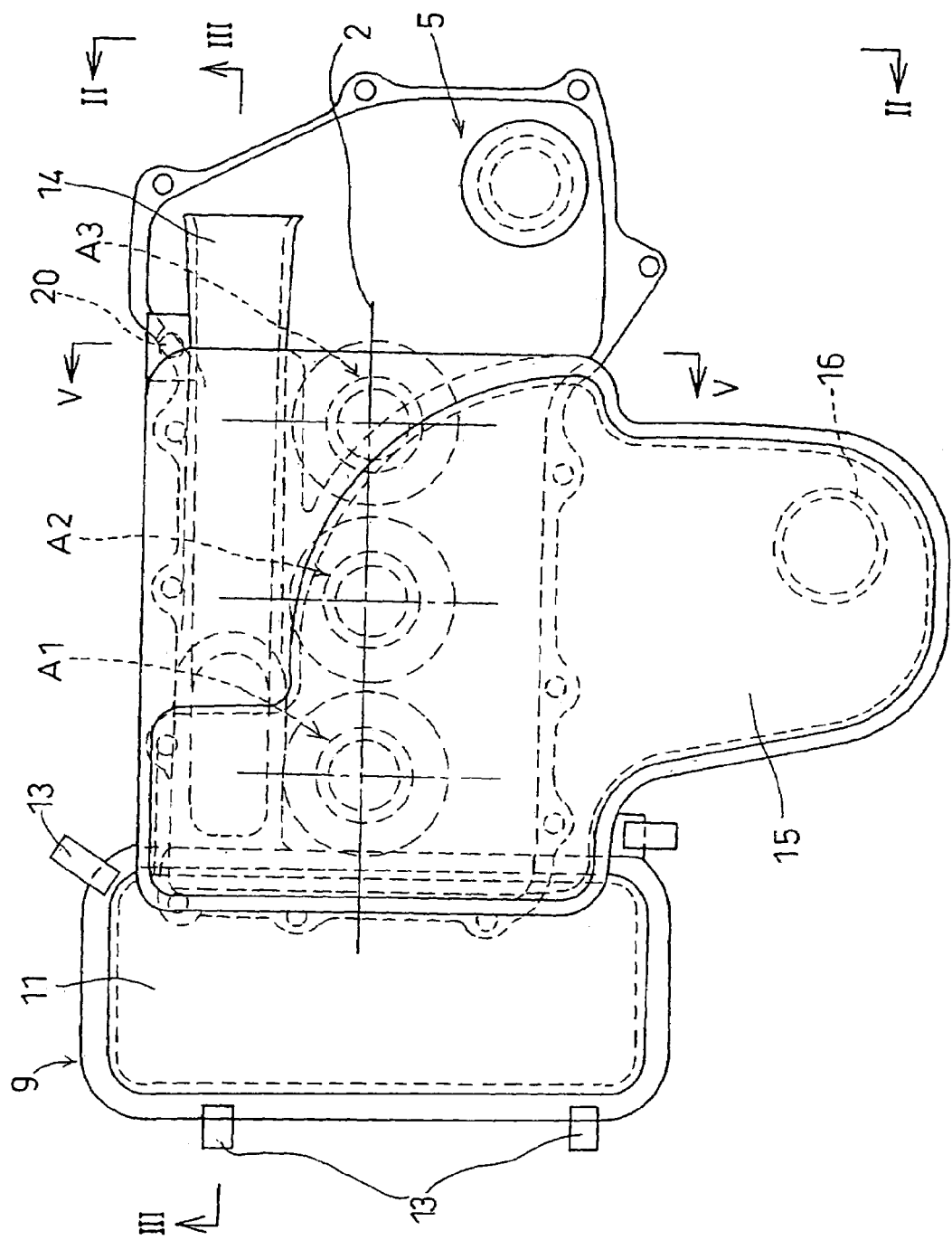
FIG. 1 is a plan view showing an embodiment of the present invention.

1 internal combustion engine
2 crank axis
4 cylinder head
5 head cover
6 intake manifold
7 throttle body
9 air cleaner
10 lower casing
11 upper casing
12 filter element
14 atmospheric air introduction pipe
15 intake pipe
17 connection pipe
20 support pin
21 bracket
22 bush

BEST MODE FOR CARRYING OUT THE INVENTION

Preferred embodiments of the present invention will be described below with reference to the accompanying drawings.

Indicated by reference sign 1 in the figures is an internal combustion engine which includes three cylinders A1, A2 and A3 aligned in the direction of a crank axis 2 in the plan view of FIG. 1.

The internal combustion engine 1 comprises a cylinder block 3, a cylinder head 4 mounted to an upper surface of the cylinder block, and a head cover 5 mounted to cover a valve train (not shown) on the cylinder head 4.

The head cover 5 is made of heat-resistant synthetic resin. The cylinder head 4 includes a longitudinal side surface 4a which extends in parallel with the crank axis 2 in the plan view of FIG. 1. To the side surface 4a, an intake manifold 6 is mounted for distributing intake air to the cylinders A1, A2 and A3. A throttle body 7 formed with an intake air introduction port 8 which opens upward is mounted on the intake manifold 6.

Indicated by reference sign 9 is an air cleaner, which is made of the same heat-resistant synthetic resin as the head cover 5. The air cleaner 9 includes a lower casing 10 which opens upward, and an upper casing 11 which opens downward. The two casings are detachably coupled to each other with a plurality of clip pieces 13, with a filter element 12 interposed therebetween.

In the plan view of FIG. 1, the air cleaner 9 is arranged at an end of the head cover 5 in the direction of the crank axis 2 so that the lower casing 10 of the air cleaner 9 vertically corresponds to the head cover 5 i.e., the lower casing 10 is positioned just beside the head cover 5.

The lower casing 10 of the air cleaner 9 is integral with the head cover 5.

Specifically, the lower casing 10 is formed integrally on the head cover 5 by using the heat-resistant synthetic resin.

The upper casing 11 of the air cleaner 9 is integrally formed with an atmospheric air introduction pipe 14 having a flared end and an air intake pipe 15, which are formed at the same time as the upper case in molding the upper case 11 using heat-resistant synthetic resin.

The atmospheric air introduction pipe 14 extends above the head cover 5 along the crank axis 2 toward the opposite end of the head cover 5. The air intake pipe 15 has a flat cross section elongated along the upper surface of the head cover 5. The air intake pipe extends along the upper surface of the head cover 5 toward the intake manifold 6 without overlapping the atmospheric air introduction pipe 14. The air intake pipe has an end provided with a connection portion 16 which opens downward. The connection portion 16 is positioned almost directly above the intake air introduction port 8 of the throttle body 7 and connected to the intake air introduction port 8 via a connection pipe 17 made of an elastic material such as rubber.

The atmospheric air introduction pipe 14 includes a lower surface formed with a downward opening 18 at a portion connected to the upper casing 11. On the other hand, at a connection portion of the head cover 5 to the lower casing 10, a communication hole 19 for providing communication with the inside of the lower casing 10 is formed at the upper surface thereof. When the upper casing 11 is coupled to the lower casing 10 with the filter element 12 interposed therebetween, the downward opening 18 of the atmospheric air introduction pipe 14 is connected to the communication hole 19 for the lower casing 10. Therefore, the atmospheric air introduction pipe 14 communicates with the inside of the lower casing 10 via the opening 18 and the communication hole 19.

A support pin 20 projecting downward is formed integrally on an end of the atmospheric air introduction pipe 14, which is farther from the upper casing 11. On the other hand, a bracket 21 is formed integrally on the upper surface of the head cover 5, and a bush 22 made of a soft elastic member such as rubber is mounted to the bracket. The support pin 20 projecting downward is removably inserted into the bush 22.

The support pin 20, the bracket 21 and the bush 22 provide engagement means for removably supporting the atmospheric air introduction pipe 14 relative to the head cover 5.

With this structure, when the atmospheric air is introduced into the lower casing 10 of the air cleaner 9 through the atmospheric air introduction pipe 14 and then into the upper casing 11 through the filter element 12, dust is filtered out by the filter element 12, whereby the air is cleaned. The cleaned air flows from the upper casing 11 to the intake manifold 6 through the air intake pipe 15 and is then sucked from the intake manifold 6 into each of the cylinders A1, A2 and A3.

In this structure, the lower casing 10 of the air cleaner 9 constitutes a dust side to which the atmospheric air is introduced as it is, whereas the upper casing 11 constitutes a clean side to which clean air after the filtering by the filter element 12 is introduced.

The air cleaner 9 is arranged at an end of the head cover 5 in the direction of the crank axis 2 so that the lower casing 10 of the air cleaner 9 vertically corresponds to the head cover 5. Therefore, the height of the portion of the air cleaner 9 which projects upward from the upper surface of the head cover 5 can be reduced by as much as the dimension by which the lower casing 10 of the air cleaner 9 vertically corresponds to the head cover 5.

Further, the atmospheric air introduction pipe 14 for introducing air to the air cleaner 9 and the air intake pipe 15 for introducing air from the air cleaner 9 to the intake manifold 6 are arranged along the upper surface of the cover 5 so as to extend in the direction of the crank axis 2 without overlapping each other. Therefore, the entire length of the head cover 5 in the direction of the crank axis 2 can be utilized for the arrangement of the atmospheric air introduction pipe 14 for introducing air into the air cleaner 9 and the air intake pipe 15 for sucking air from the air cleaner 9. Therefore, both of the atmospheric air introduction pipe 14 and the air intake pipe 15 can have a length sufficient to enhance the air intake efficiency, while, at the same time, the portion of the atmospheric air introduction pipe 14 which projects out from the internal combustion engine can be made small or eliminated like the example shown in the figures.

Since the atmospheric air introduction pipe 14 is supported by the head cover 5 by inserting the support pin 20 into the bush 22 of the head cover 5, the atmospheric air introduction pipe 14 is reliably prevented from vibrating.

Figure 2:
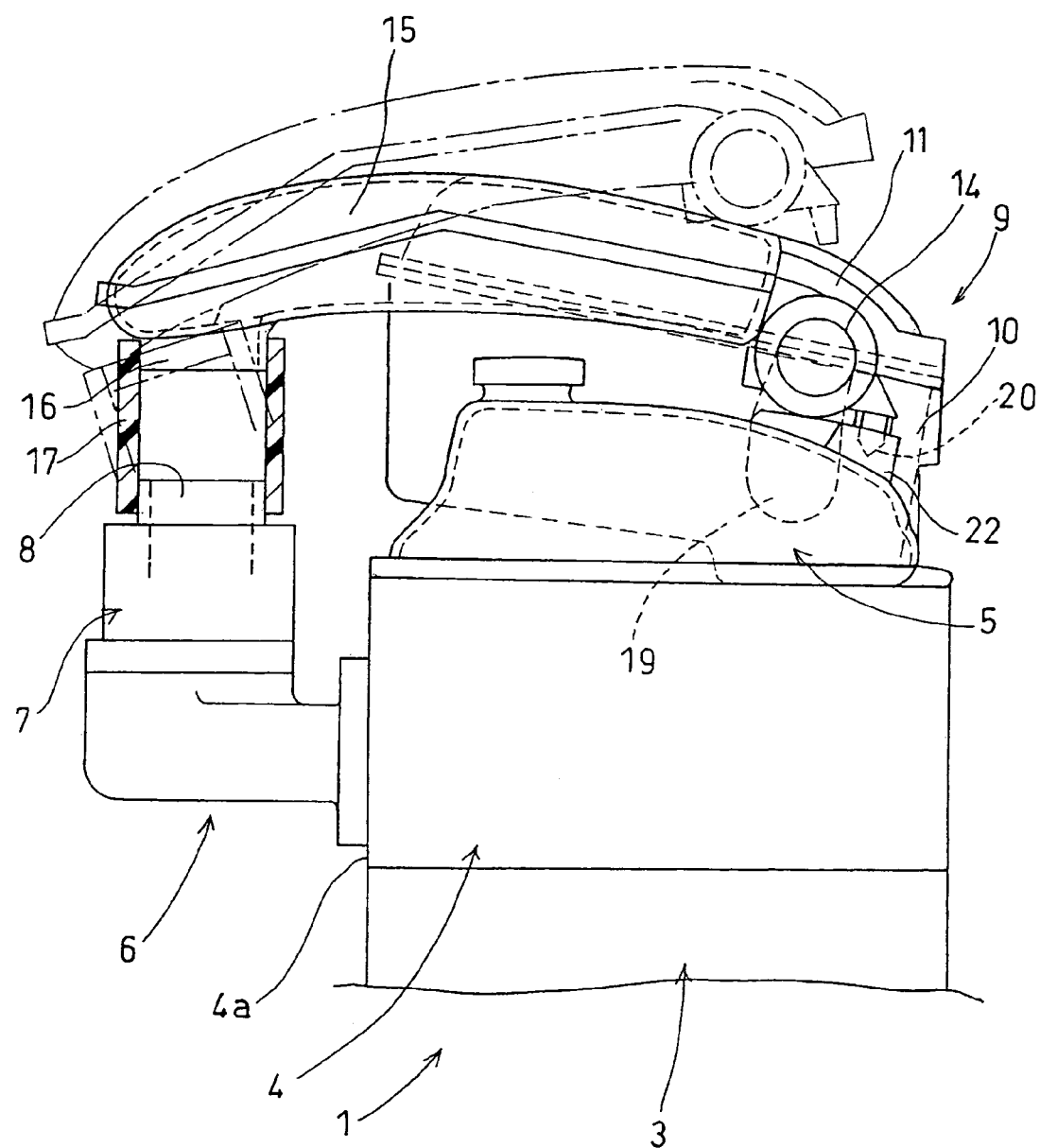
FIG. 2 is a side view taken along lines II-II in FIG. 1.
Figure 3:
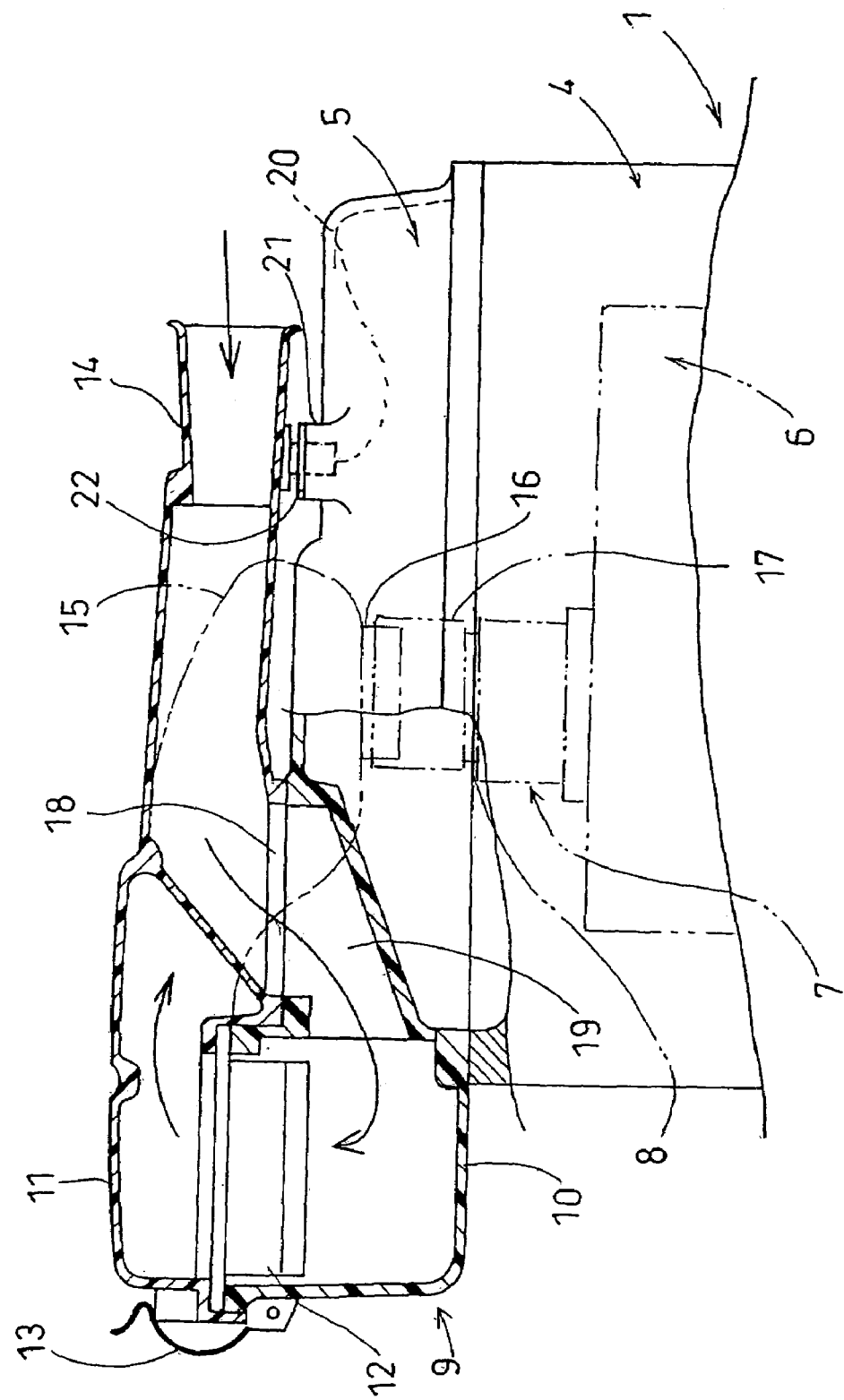
FIG. 3 is a sectional view taken along lines III-III in FIG. 1.
Figure 4:
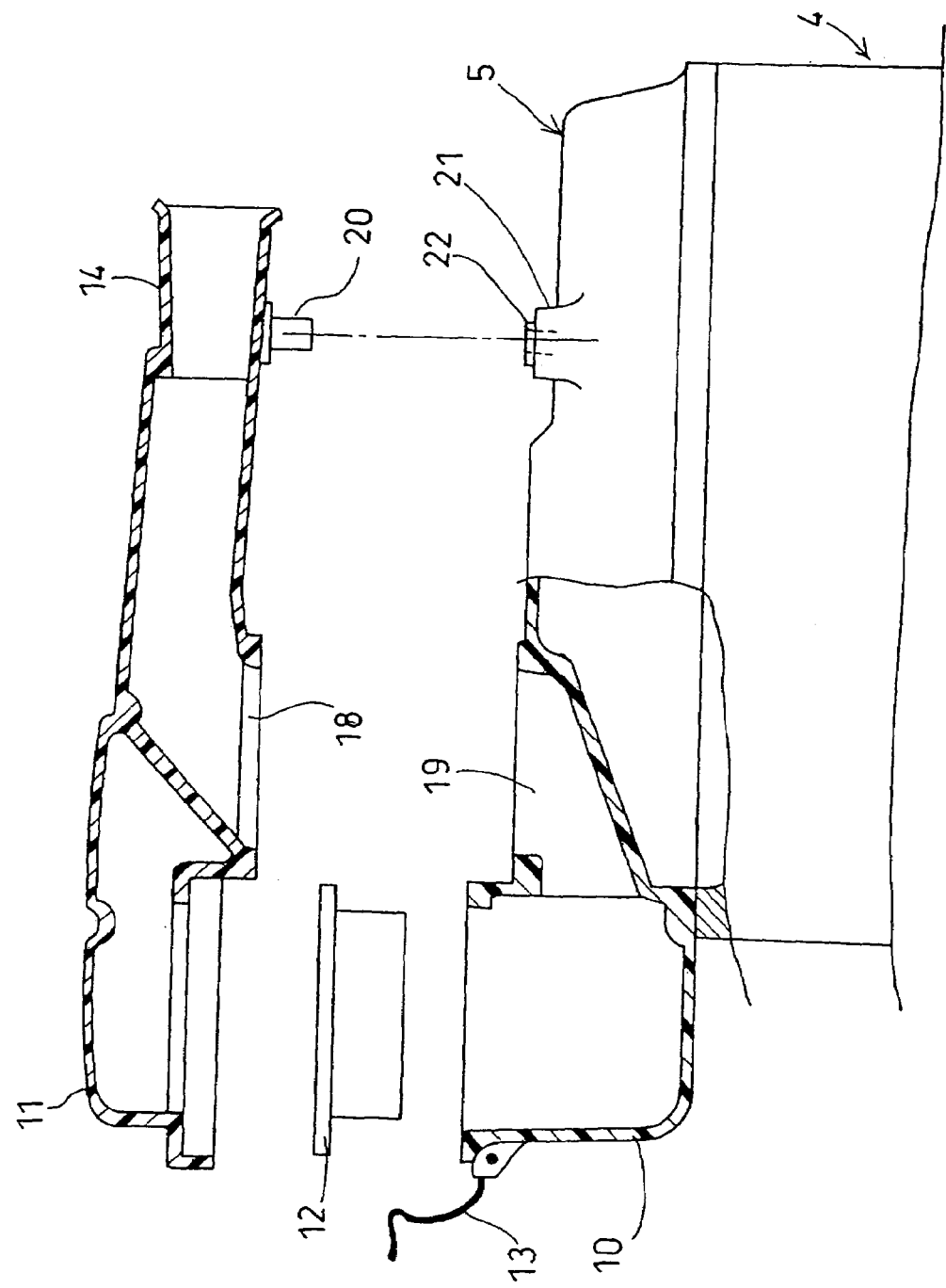
FIG. 4 shows the exploded view of FIG. 3.
Figure 5:
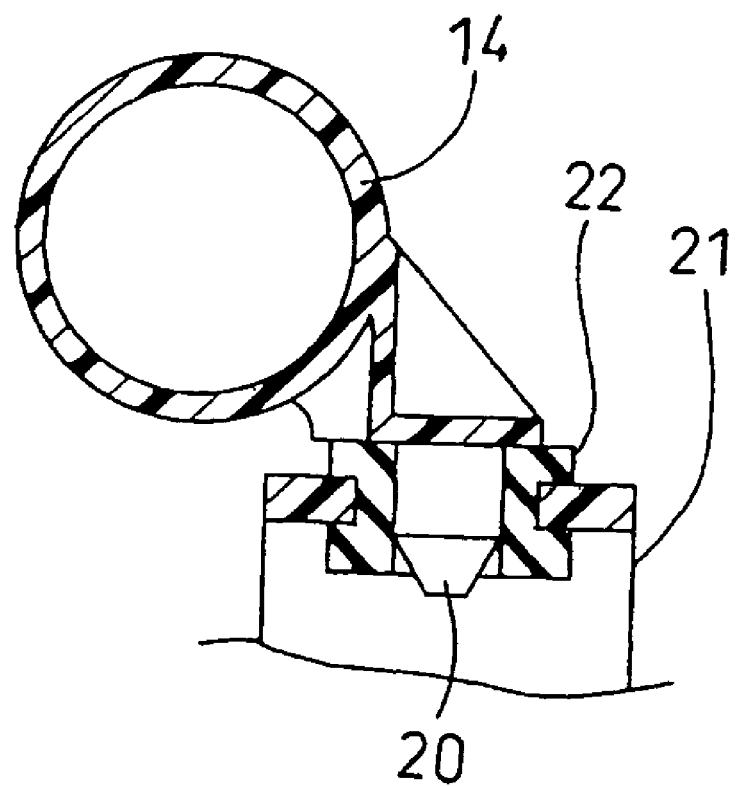
FIG. 5 is an enlarged sectional view taken along lines V-V in FIG. 1.

To replace the filter element 12 of the air cleaner 9, the clip pieces 13 coupling the upper casing 10 and the lower casing 11 are removed, and the upper casing 11 is lifted, as indicated by double dashed lines in FIG. 2. In lifting the upper casing 11, the connection pipe 17 made of an elastic material and connecting the end of the air intake pipe 15 integrally formed on the upper casing 11 to the throttle body 7 mounted to the air intake manifold 6 is bent into a dogleg shape.

When the replacement of the filter element 12 is finished, the upper casing 11 is lowered to be positioned relative to the lower casing 10 and coupled to the lower casing with the clip pieces 13. The positioning of the upper casing 11 relative to the lower casing 10 can be performed easily and accurately by inserting the support pin 20 of the atmospheric air introduction pipe 14 integrally formed on the upper casing 11 into the bush 22 of the head cover 5.

The upper casing 11 of the air cleaner 9, which is moved for attachment to or detachment from the lower casing 10, is on the clean side, and little dust adheres to the upper casing. Therefore, the detachment of the upper casing 11 to replace the filter element 12 hardly causes scatter of dust.

Since the intake air introduction port 8 of the throttle body 7 mounted to the air intake manifold 6 is oriented upward whereas the connection portion 16 at the end of the air intake pipe 15 from the air cleaner 9 is oriented downward and positioned directly above the intake air introduction port 8, the connection pipe 17 made of an elastic material can be made generally straight, so that the connection is easy. Further, as noted before, the replacement of the filter element 12 of the air cleaner 9 can be performed without disassembling the connection pipe 17.

The means for removably engaging the atmospheric air introduction pipe 14 with the cover 5 is not limited to the insertion of the support pin 20 provided at the atmospheric air introduction pipe 14 into the bush 22 provided at the head cover 5, and other structures may be employed. For instance, the support pin may be provided at the head cover 5, whereas the bush may be provided at the atmospheric air introduction pipe 14.

The filter element 12 of the air cleaner 9 does not necessarily need to be interposed between the upper and the lower casings 10 and 11 like the foregoing embodiment. For instance, the filter element may be incorporated in the lower casing 10 or the upper casing 11 so as to be inclined or not to be inclined.

The invention claimed is:

1. An air intake device of an internal combustion engine including a cylinder head, an intake manifold provided at a longitudinal side surface of the cylinder head, the side surface extending in parallel with a crank axis of the cylinder head, and a head cover provided on the cylinder head, the air intake device comprising: an air cleaner including an upper casing and a lower casing detachably coupled to each other and incorporating a filter element, an atmospheric air introduction pipe for introducing air to the air cleaner, and an intake pipe extending from the air cleaner to the intake manifold;

wherein the lower casing of the air cleaner is on a dust side, whereas the upper casing of the air cleaner is on a clean side, wherein the air cleaner is provided at an end of the head cover in a direction of the crank axis so that the lower casing of the air cleaner vertically corresponds to the head cover, wherein the atmospheric air introduction pipe is arranged above the head cover to extend along an upper surface of the head cover in the direction of the crank axis, whereas the intake pipe is arranged to extend along the upper surface of the head cover toward the intake manifold without overlapping the atmospheric air introduction pipe, and wherein the lower casing is formed integrally on the head cover, whereas the atmospheric air introduction pipe and the intake pipe are formed integrally on the upper casing so that the atmospheric air introduction pipe opens into the lower casing.

2. The air intake device of internal combustion engine according to claim 1, wherein the intake pipe has a flat cross section elongated along the upper surface of the head cover.

3. The air intake device of internal combustion engine according to claim 1, wherein the intake pipe is connected to the intake manifold via a connection pipe made of an elastic material.

4. The air intake device of internal combustion engine according to claim 1, wherein engagement means for removable engagement is provided between the atmospheric air introduction pipe and the head cover.

5. The air intake device of internal combustion engine according to claim 4, wherein the intake pipe is connected to the intake manifold via a connection pipe made of an elastic material.

* * * * *